United States Patent [19]

Sotirianos

[11] 4,139,350
[45] Feb. 13, 1979

[54] APPARATUS FOR AND A METHOD OF SEPARATING A FOAM INTO ITS LIQUID AND GASEOUS COMPONENTS

[75] Inventor: Konstantin Sotirianos, Stafa, Switzerland

[73] Assignee: Process Engineering Company, Männedorf, Switzerland

[21] Appl. No.: 840,625

[22] Filed: Oct. 11, 1977

[30] Foreign Application Priority Data

Oct. 11, 1976 [CH] Switzerland .................. 12910/76

[51] Int. Cl.² ........................................... B01D 19/02
[52] U.S. Cl. ......................................... 55/42; 55/87; 55/178; 55/200
[58] Field of Search .................. 55/36, 40, 41, 87, 178, 55/199, 200, 42

[56] References Cited

U.S. PATENT DOCUMENTS

| | | | |
|---|---|---|---|
| 2,023,630 | 12/1935 | von Le Juge | 55/200 |
| 2,908,652 | 10/1959 | Forrester | 55/178 X |
| 3,116,134 | 12/1963 | May | 55/200 X |
| 3,230,691 | 1/1966 | Kurashige | 55/200 X |
| 3,501,414 | 3/1970 | Mueller | 55/178 X |
| 3,577,868 | 5/1971 | Muller | 55/178 |
| 3,616,260 | 10/1971 | Muller | 55/178 X |
| 3,693,325 | 9/1972 | Muller | 55/178 |

FOREIGN PATENT DOCUMENTS

| | | | |
|---|---|---|---|
| 446435 | 1/1948 | Canada | 55/178 |
| 725871 | 10/1942 | Fed. Rep. of Germany | 55/200 |

*Primary Examiner*—Robert H. Spitzer
*Attorney, Agent, or Firm*—Michael J. Striker

[57] ABSTRACT

An apparatus for separating a foam into its constituent liquid and gaseous components has a vessel in which the foam is formed, and a foam-breaking means including a housing communicating with the vessel, rotatable foam breakers located in the housing for breaking up the foam, and hollow stationary baffles for preventing a smooth circulation of the foam. The foam-breaking means also include means for facilitating the separation of the foam by admitting a heat exchange substance into the hollows of the baffles and effecting a heat exchange between the heat exchange substance and the foam. The method in accordance with the invention comprises the steps of feeding the foam from the vessel into the housing, breaking up the foam by the foam breakers, effecting turbulence of the foam by the baffles so as to prevent the smooth circulation of the foam, and admitting the heat exchange substance into the hollows of the baffles for effecting heat exchange between the latter and the foam.

16 Claims, 3 Drawing Figures

APPARATUS FOR AND A METHOD OF SEPARATING A FOAM INTO ITS LIQUID AND GASEOUS COMPONENTS

BACKGROUND OF THE INVENTION

The present invention relates to an apparatus for and a method of separating a foam into its constituent liquid and gaseous components.

Apparatuses and methods of separating the foam into its liquid and gaseous components have been proposed in the art. The known apparatus has a housing which straddles an opening of a reactor vessel and communicates with the latter through the opening. A plurality of rotatable plate-like foam breakers are located in the housing and mounted on a vertical rotatable shaft which extends in the housing and is journalled by an upper bearing and a lower bearing. A plurality of baffles, also known as "chicanes", are mounted on a wall of the housing and are radially outwardly spaced from the foam breakers.

In such an apparatus a foam is fed from the reactor vessel into the housing, and the foam breaker breaks up the foam into its constituent liquid and gaseous components, whereas the baffles cause turbulence and prevents the foam from smooth circulation.

The above mentioned known apparatus and method are basically satisfactory for separating regular or soft foam, however, they do not guarantee the separation of foam having a high viscosity or a hard foam.

SUMMARY OF THE INVENTION

Accordingly, it is an object of the present invention to provide an apparatus for and a method of separating a foam into its liquid and gaseous components which avoid the disadvantages of the prior art.

More particularly, it is an object of the present invention to provide an apparatus for and a method of separating a foam into its constituent liquid and gaseous components, in which the above separation is facilitated.

Another object of the present invention is to provide an apparatus for and a method of separating foam into its constituent liquid and gaseous components which guarantee the separation of foams having a high viscosity or hard foams.

In keeping with this object, and with others which will become apparent hereinafter, one feature of the present invention resides briefly stated in an apparatus for separating a foam into its constituent liquid and gaseous components, comprising a vessel having an opening, and foam-breaking means including a housing communicating with the vessel through the openings, rotatable foam breakers located in the housing for breaking up the foam, hollow stationary baffles located in the housing for preventing a smooth circulation of the foam, and means for facilitating the separation of the foam by admitting a heat exchange substance into the hollows of the baffles and effecting a heat exchange between the heat exchange substance and the foam.

Another feature of the present invention is a method of separating a foam into its constituent liquid and gaseous components including the steps of feeding the foam from a vessel into a housing in which rotatable foam breakers and hollow stationary baffles are located, breaking up the foam by the rotating foam breakers, effecting turbulence of the foam by the baffles so as to prevent a smooth circulation of the foam, and admitting a heat exchange substance into the hollows of the baffles so as to effect a heat exchange between the heat exchange substance and the foam.

In the above construction and method the foam to be separated is admitted into the housing and thereafter is not only being broken up by the rotating foam breakers and subjected to turbulence by the stationary baffles, but is also subjected to the action of heat which is transferred from the heat exchange substance admitted into the hollow baffles. When the foam is of such a nature that its separation is facilitated by heating, a heating substance is admitted into the hollows of the baffles. When the foam is of such a nature that its separation is facilitated by cooling, a cooling substance is admitted into the hollows of the baffles. The heat of the heat exchange substance is transmitted from the latter through the baffles to the foam to be separated, heats or cools the foam and thereby facilitates the separation of the foam.

Another feature of the present invention is that the baffles may outwardly surround the foam breakers. The foam breakers may be located adjacent to an axis of the housing, whereas the baffles may be located between a wall of the housing and the foam breakers.

A further feature of the present invention is that each of the baffles may have a portion extending in the direction of the axis of the housing, or may have a radial portion located below the foam breakers. It is also possible that each of the baffles has both the axially extending portion and the radially extending portion.

A still further feature of the present invention is that the apparatus may have one or two conduits communicating the hollows of the baffles with one another. When the two conduits are provided, one of them may connect upper sections of the baffles, whereas the other conduit may connect lower sections of the baffles with one another. The conduits are preferably ring-shaped.

Finally, an additional feature of the present invention is that the baffles are movable relative to one another so that their relative location may be adjusted.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENT

Figure 1:
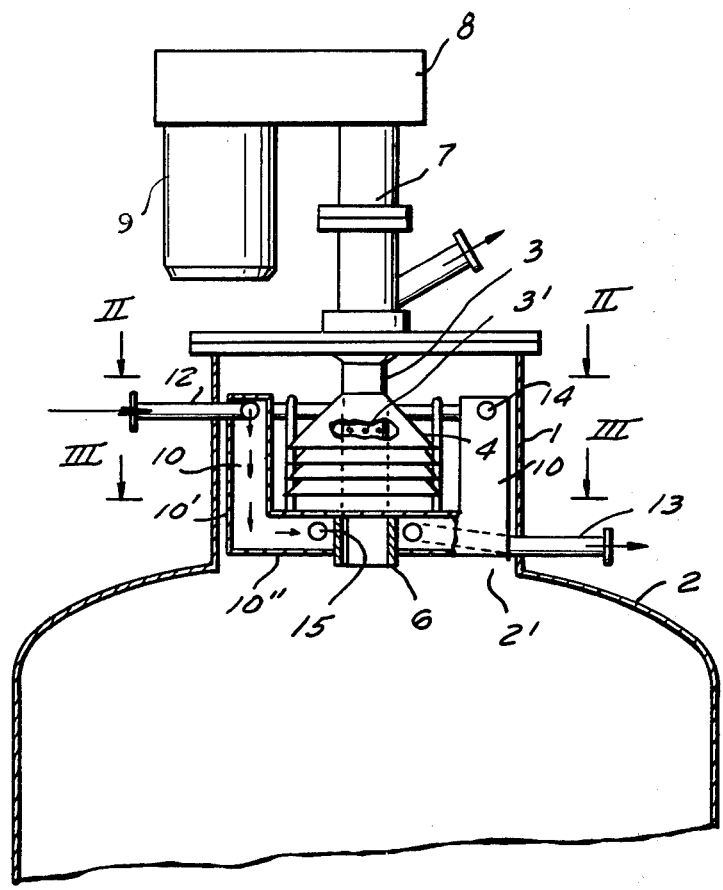
FIG. 1 is a fragmentary vertical section of an apparatus for separating foam into its constituent liquid and gaseous components, in accordance with the present invention.
Figures 2, 3:
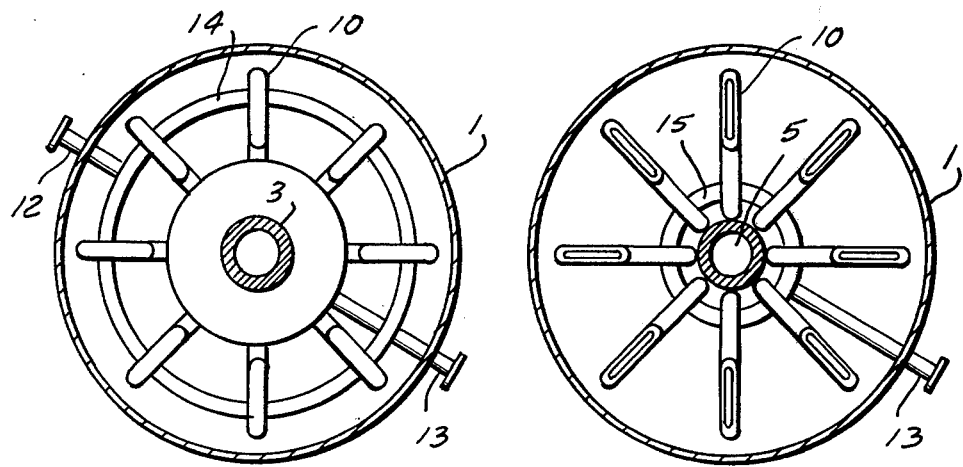
FIG. 2 is a section of the apparatus taken on the line II—II of FIG. 1.
FIG. 3 is a section of the apparatus taken on the line III—III of FIG. 1.

An apparatus for separating a foam into its constituent liquid and gaseous components is shown in FIG. 1 and has a housing 1 which is mounted on a reactor vessel 2 so as to straddle an opening 2' of the vessel.

A rotatable shaft 3 extends into the housing 1, and a plurality of foam breakers 4 are mounted on the shaft 3. The foam breakers 4 are plate-like members which are spaced from one another in the direction of an axis of rotation of the shaft 3. The shaft 3 is hollow at least in a region where the foam breakers 4 are mounted thereon and has apertures 3'. The shaft 3 is journalled in a lower bearing 6 and an upper bearing 7, which bearings are spaced from one another in the direction of the axis of the shaft 3. The shaft is operatively connected with drive means including a transmission 8 and an electrical motor 9. An outlet pipe 11 is inclined relative to a side wall of the housing 1 and defines an outlet of the latter.

A plurality of baffles or "chicanes" 10 are located in a space between the foam breakers 4 and the side wall of the housing 1, so as to surround the foam breakers 4. Each of the baffles 10 is hollow and has a first portion 10' extending in the direction of the axis of the shaft 3 and a second portion 10" extending in the radial direction relative to this axis. Each of the baffles 10 is located diametrically opposite relative to another baffle, and the thus-located two baffles are connected with one another so as to form together a U-shaped structure. In the above construction of the baffles 10, the foam breakers 4 are not only radially outwardly surrounded by the baffles 10 but are also surrounded by the latter from below. The baffles are movable relative to one another so that their relative locations may be adjusted.

The hollows of the baffles 10 communicate with one another by an upper conduit 14 connected to upper sections of the baffles, and by a lower conduit 15 connected to lower sections of the baffles. As shown in the drawing, the upper conduit 14 communicates with one another the axially extending portions 10' of the baffles, whereas the lower conduit 15 communicates with one another the radially extending portions 10" of the baffles. An inlet pipe 12 and the outlet pipe 13 are provided, communicating with the respective conduits 14 and 15. It is understood that the inlet pipe 12 and the outlet pipe 13 may communicate directly with the baffles 10. A heat exchange substance is admitted into the hollows of the baffles 10.

A method in accordance with the present invention is performed in connection with the above apparatus as follows:

A foam to be separated rises through the opening 2' of the vessel 2 into the housing 1 and is separated into its constituent components by the foam-breakers 4. The liquid component is flung against the baffles 10 and runs back into the vessel 2, whereas the gaseous component escapes through the holes 3' into the interior of the shaft 3 and thereafter travels upwardly therein to escape through the outlet conduit 11. When a heating substance is admitted into the baffles 10 the latter are heated by the same. When after this the foam is brought into contact with the thus-heated baffles, the heat is transferred to the foam and the characteristics of the foam are changed, so that the separation of the foam is substantially facilitated. The hard foams which could not be completely decomposed by the known methods, are completely separated by the present method inasmuch as the foam is flung against the baffles and is subjected to the action of impact and heat.

There are some foams whose separation is facilitated not by heating, but contrary to this, by cooling the same. In the case when such foams are to be separated, a cooling substance is admitted into the hollows of the baffles 10.

The completeness of the separation of the foam depends upon the speed of rotation of the heat exchange substance, as well as upon the temperature of the latter. The location of the baffles relative to one another also substantially affects the speed of the separation of the foam. It is understood that for each particular type of the foams respective operational conditions must be determined empirically.

It will be understood that each of the elements described above, or two or more together, may also find a useful application in other types of constructions differing from the types described above.

While the invention has been illustrated and described as embodied in an apparatus for and a method of separating a foam into its liquid and gaseous components, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In an apparatus for separating a foam into its constituent liquid and gaseous components, a combination comprising a vessel in which the foam is formed and having an opening; and foam-breaking means including a housing communicating with said vessel through said opening, rotatable foam breakers located in said housing for breaking up the foam, means for rotating said foam breakers, hollow stationary baffles located in said housing and outwardly surrounding said foam breakers for preventing a smooth circulation of the foam, and means for facilitating the separation of the foam by admitting a heat exchange substance into the hollows of said baffles and effecting a heat exchange between said heat exchange substance and the foam.

2. The combination as defined in claim 1, wherein said facilitating means include an inlet and an outlet formed in each of said baffles so as to feed said heat exchange substance into and to evacuate the same from the hollow of a respective baffle.

3. The combination as defined in claim 1, wherein said housing has an axis and a wall spaced from said axis, said foam breakers being located adjacent to said axis, said baffles being located between said foam breakers and said wall of said housing.

4. The combination as defined in claim 1, wherein said housing has an axis and said foam breakers are spaced from one another in the direction of said axis, each of said baffles having a portion extending in the direction of said axis.

5. The combination as defined in claim 4, wherein said axis is substantially vertical, each of said baffles further having a further portion located below said foam breakers and communicating with said first-mentioned portion thereof.

6. The combination as defined in claim 5, wherein said baffles include a plurality of pairs of baffles, the baffles of each of said pairs being diametrically oppositely located relative to one another and connected with one another so as to form together a U-shaped structure.

7. The combination as defined in claim 5, wherein said further portion extends in a substantially radial direction relative to said axis.

8. The combination as defined in claim 1, wherein said housing has a substantially vertical axis and said foam breakers are spaced from one another in the direction of said axis, each of said baffles having a portion located below said foam breakers.

9. The combination as defined in claim 1; and further comprising a conduit communicating the hollows of said baffles with one another.

10. The combination as defined in claim 9, wherein said conduit is ring-shaped.

11. The combination as defined in claim 1, wherein said baffles extend in a substantially vertical direction and each has an upper section and a lower section spaced from one another; and further comprising a first conduit connected with said upper sections of said baffles so as to communicate the hollows of said baffles with one another.

12. The combination as defined in claim 11; and further comprising a second conduit connected with said lower sections of said baffles so as to further communicate the hollows of said baffles with one another.

13. The combination as defined in claim 1, wherein said baffles are adjustable in their locations relative to one another.

14. The combination as defined in claim 1, wherein said foam breakers are plate-like members.

15. The combination as defined in claim 1; said means for rotating said foam breakers includes a shaft extending in the interior of said housing and carrying said foam breakers, bearings journalling said shaft at axially spaced locations for rotation about the longitudinal axis of said shaft, and a drive for rotation of said shaft about said axis.

16. A method of separating into its constituent liquid and gaseous components a foam formed in a vessel having an opening, comprising the steps of feeding the foam into a housing communicating with the vessel through the opening and having rotatable foam breakers and hollow stationary baffles;

breaking up the foam by the rotating foam breakers;

effecting turbulence of the foam by the stationary baffles so as to prevent a smooth circulation of the foam; and admitting a heat exchange substance into the hollows of said baffles so as to effect heat exchange between the heat exchange substance and the foam and to thereby facilitate the separation of the foam.

* * * * *